Feb. 3, 1931. C. F. HEYWOOD 1,790,705
VALVE
Filed March 26, 1928
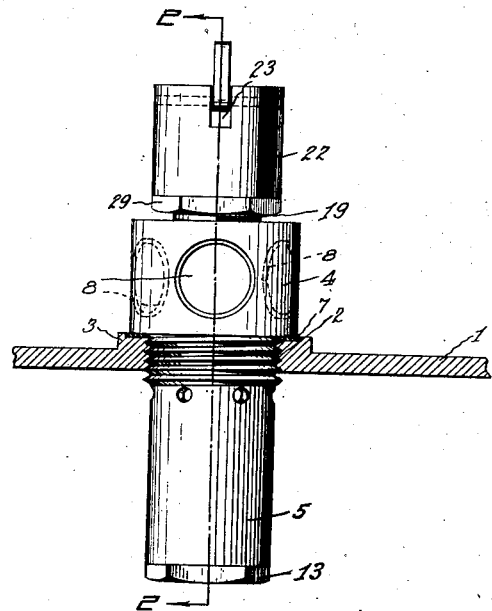
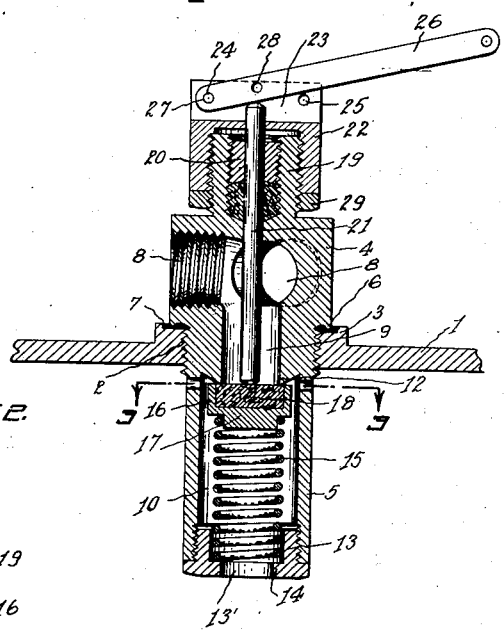
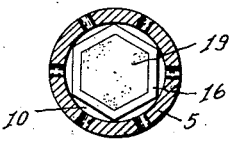
Inventor
Charles F. Heywood
By
Attorney Patented Feb. 3, 1931

1,790,705

UNITED STATES PATENT OFFICE

CHARLES F. HEYWOOD, OF DETROIT, MICHIGAN, ASSIGNOR TO SKY SPECIALTIES CORPORATION, OF DETROIT, MICHIGAN, A CORPORATION OF MICHIGAN

VALVE

Application filed March 26, 1928. Serial No. 264,814.

The present invention pertains to a novel valve constructed more particularly for the purpose of controlling the flow of compressed air out of a tank. The valve is designed primarily for use in the starting of engines by compressed air, and the principal object is to provide such a valve that will reach its full discharge or wide open position on a short displacement of the control member.

This object is accomplished by providing peripheral inlet ports in the valve casing adjacent a central valve seat and also furnishing a larger or auxiliary port in an end of the casing. Due to this formation, a large air carrying space is disposed around the valve seat, and a short displacement of the valve head permits an opening of sufficient size to carry the required charge of air.

A further feature of the invention resides in the construction of a valve having its sealing parts disposed within the tank, while certain of the operating parts are positioned outside the tank. Another characteristic is the provision of an angularly adjustable head carrying the operating lever, so that after the valve has been screwed tightly into the tank, this head may be adjusted to bring the operating lever to the desired and most convenient position. In this connection, the operating lever is capable of at least two different modes of connection to the head, so that it may operate on the valve stem as either a first or a second class lever. The invention still further includes a stuffing box which is independent of the adjustable head.

The invention is fully disclosed by way of example in the following description and in the accompanying drawing, in which—

Figure 1 is a side elevation of the device;

Fig. 2 is a longitudinal section on the line 2—2 of Figure 1; and

Fig. 3 is a transverse section on the line 3—3 of Figure 2.

Reference to these views will now be made by use of like characters which are employed to designate corresponding parts throughout.

In Figures 1 and 2 is illustrated the wall of a tank 1 having a threaded opening 2 and an exterior shoulder 3 surrounding the opening. Into this opening is threaded a valve casing 4 having a lower or inner portion 5 positioned within the tank. The body of the valve has a sharp downwardly extending shoulder 6 which embeds itself into a washer 7 inserted in the shoulder 3. The body is further formed with three separate outlets 8 for the purpose presently to be described, all these outlets communicating with a common passage 9 which in turn is in communication with the chamber 10 constituting the interior of the lower portion 5. A valve seat 12 is formed between the chamber 10 and passage 9.

The lower end of the body or casing is open and is fitted with a ring or bushing 13 having an internal flange 14. This flange supports a spring 15 on which rests an hexagonal valve head 16 cooperating with the seat 12 and having its vertices in engagement with the inner wall of the portion 5 as indicated in Figure 3. The valve head is of brass and is formed with a stud 17 which enters the end of the spring 15 whereby the head is definitely supported. The head further carries a fiber insert 18 adapted to bear against the seat 12 and to provide a more perfect closure than is obtainable with metal.

The upper end of the valve body is in the form of a neck 19 containing packing and into which is screwed a packing gland 20. A stem 21 passes slidably through the packing and gland and rests upon the valve head as clearly shown in Figure 2.

On the neck 19 is threaded a lever support or head 22 having at its upper end a diametrical slot 23. The support is drilled transversely through the ends of the slot as indicated by the numerals 24 and 25. A lever 26 adapted to be anchored in the slot for acting upon the stem 21 is formed with an aperture 27 in one end, and a similar aperture 28 slightly beyond this end. When the head 22 and lever are joined together by a pin passed through the apertures 24 and 27 thereof, the lever is of the second class and depresses the valve stem when the free end is pushed downwardly. If the lever is released and shifted so that the aperture 28 registers with the aperture 25, and a pin is passed through these apertures, the lever is of the first class, wherein one end engages the valve stem and the other end on being raised will cause the valve stem to be lowered.

Considering now the operation of the valve, it will be seen that the positioning of the ports within the tank results in the constant pressure of compressed air directly at the valve seat. The supply of air is further supplemented by the opening 13' in the ring 13, this supply being permitted to pass between the faces of the valve head and the inner wall of the lower portion 5. A slight depression of the valve head will therefore permit full discharge through the passage 9.

If the valve casing has been screwed tightly into the wall of the tank, one of the outlets 8 is selected with respect to the pipe to which it is to be connected, and the remaining outlets are plugged. It is also desirable to bring the lever 26 to the most convenient position, and this is accomplished by turning the head 22 on its threads and then securing it by a lock nut 29 threaded on the neck 19 and engaging the lower end of the head.

Although a specific embodiment of the invention has been illustrated and described, it will be understood that various alterations in the details of construction may be made without departing from the scope of the invention as indicated by the appended claims.

What I claim is:—

1. A valve comprising a casing, a valve seat formed therein, inlet means in said casing wall adjacent said seat, and a head having parts spaced from the wall of the casing and cooperating with said seat, said casing having another inlet port in an end thereof.

2. A valve comprising a casing, a valve seat formed therein, inlet means in said casing wall adjacent said seat, a head having parts spaced from the wall of the casing and cooperating with said seat, said casing having an open end opposite said seat, a spring support fitted to said end, and a spring resting on said support and supporting said head.

3. A valve comprising a casing, a valve seat formed therein, inlet means in said casing wall adjacent said seat, a head having parts spaced from the wall of the casing and cooperating with said seat, said casing having an open end opposite said seat, an open ring fitted to said end, and a spring resting on said ring and supporting said valve head.

4. A valve comprising a casing, a valve seat formed therein, a valve head cooperating with said seat, inlet-means in said casing wall at said seat, a stem slidable through an end of said casing and engaging said head, a lever support mounted on said end and adapted for angular adjustment thereon, and a lever pivoted to said support and engaging said stem.

5. A valve comprising a casing, a valve seat formed therein, a valve head cooperating with said seat, a stem slidable through an end of said casing and engaging said head, a lever support mounted on said end, and a lever having one end and an intermediate point adapted for pivotal attachment to two different points on said support and adapted to engage said stem in either adjustment, whereby said lever may be set to operate upon said stem as either a first or a second class lever.

In testimony whereof I affix my signature.
CHARLES F. HEYWOOD.